Sept. 10, 1946.   F. M. REID   2,407,345
SPRING SUSPENSION
Filed June 9, 1944   2 Sheets-Sheet 1

INVENTOR.
Frederick M. Reid.
BY
Harness, Dickey & Pierce
ATTORNEYS

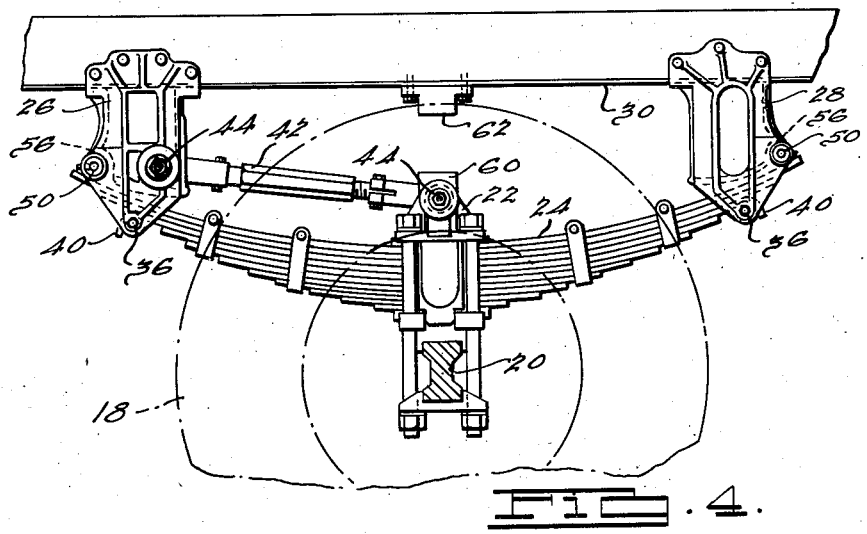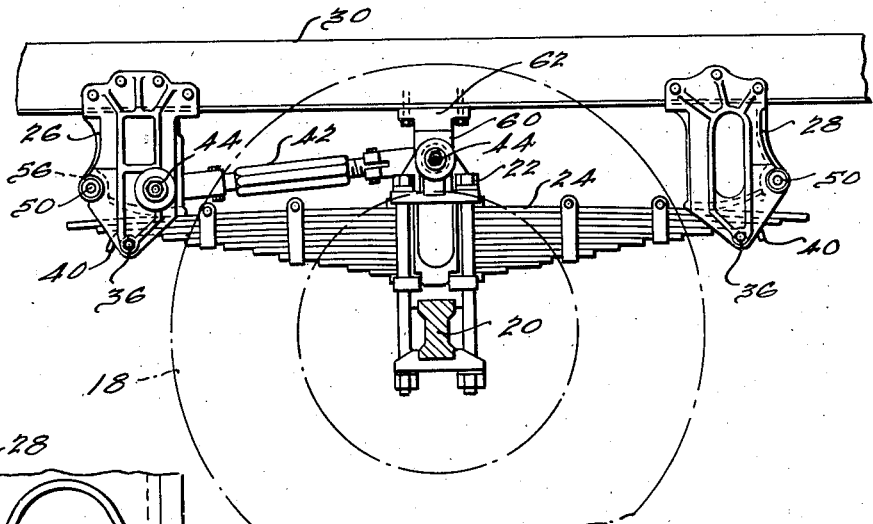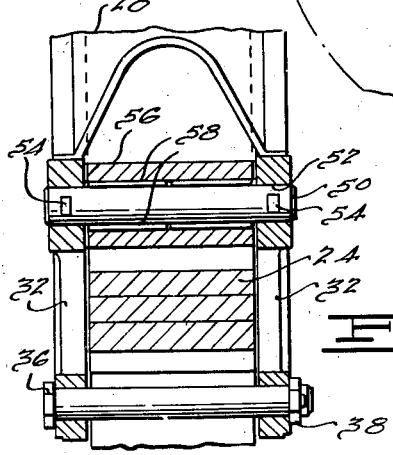

Patented Sept. 10, 1946

2,407,345

UNITED STATES PATENT OFFICE 2,407,345

SPRING SUSPENSION

Frederick M. Reid, Detroit, Mich., assignor to Fruehauf Trailer Company, Detroit, Mich., a corporation of Michigan Application June 9, 1944, Serial No. 539,472

5 Claims. (Cl. 267—44)

1

This invention relates to spring suspensions and has particular relation to spring suspensions adaptab'e for use on semitrailers, the principal object being the provision of a spring suspension having certain new and novel characteristics.

Objects of the invention include the provision of a spring suspension particularly adaptable for trailer vehicles so constructed and arranged as to function satisfactorily under wide ranges of load imposed thereon; the provision of a spring suspension of the progressive type employing semi-elliptic types of springs and so constructed and arranged as to readily yield under relatively light loads imposed thereon whereby to provide an easy ride under such conditions, and in which the spring rate is increased in accordance with the load imposed on the springs, thereby enabling the springs to take a relatively heavy load; the provision of a construction as above described in which the movement between the springs and the frame of the vehicle is taken through rollers under light load conditions and through fixed surfaces under heavy load conditions; the provision of a construction as above described in which, when the load is taken through the fixed surfaces, the springs are approximately flat whereby a minimum of slippage occurs between the springs and the fixed surfaces, thereby materially reducing wear occasioned by said slippage; and the provision of a construction as above described in which the parts are so proportioned that when the load on the springs becomes great enough to exceed the load which the rollers may safely carry without undue danger of overloading them the load of the vehicle transmitted to the springs is transmitted through the fixed surfaces, thereby relieving the rollers of load under such conditions.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a side elevational view of a semi-trailer equipped with a spring suspension constructed in accordance with the present invention, the forward end of the semitrailer being shown supported on a tractor vehicle a portion only of which is shown.

2

Fig. 3 is an enlarged, fragmentary transverse sectional view taken on the line 3—3 of Fig. 2;

Fig. 4 is a view similar to Fig. 2 but illustrating the parts of the mechanism substantially in their no-load position and, Fig. 5 is a view similar to Figs. 2 and 4 except that illustrating the parts of the mechanism in their so-called "slam" position, that is under a position of maximum load.

Figure 1:
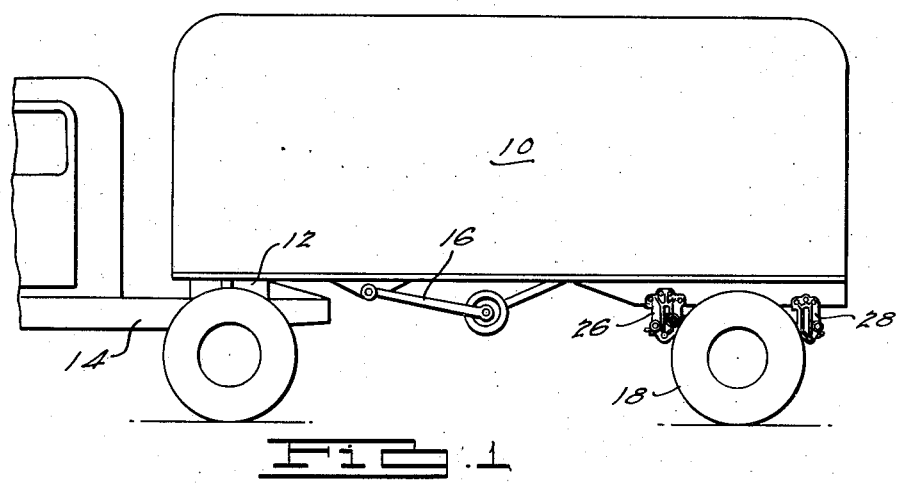

The present invention relates to the same class of spring suspension mechanism shown and described in my United States Letters Patent No. 2,191,941, issued February 27, 1940 on spring suspension. Any details of construction not fully shown in the present drawings may be considered as identical to the details of construction shown in the drawings of the issued patent above identified.

In my prior patent above identified, the supporting axle of the semitrailer there shown is connected to the body adjacent each end of the axle by means of semi-elliptic leaf springs. The axle is restrained in its movement longitudinally of the vehicle by means of a radius rod interconnecting the frame of the vehicle and the axle at each side of the former and the opposite ends of each spring transmits the load of the vehicle to the axle through fixed contact surfaces which are curved in side elevation in such a manner that as the spring straightens out under load the effective length of the spring is shortened, thereby rendering the spring stiffer under such conditions to aid it in supporting such load. In other words, it provides a so-called "progressive" type of spring mounting.

While the spring suspension of my prior patent above referred to is generally satisfactory, it does include one unsatisfactory condition. This occurs when the vehicle is under a light load, or no load at all, at which time the springs are in a position of substantial curvature and under which conditions variations in distance between the axles or wheels and the vehicle body or frame, as for instance, caused by the vehicle traveling over an uneven road surface, causes an excessive amount of slippage between the ends of the spring and the fixed abutments, or surfaces through which the load on the vehicle is transmitted to the springs, which excessive amount of slippage results in a corresponding excessive amount of wear. This is particularly true where the amount of curvature of the springs in free condition is relatively great so as to adapt the springs to proper springing of the vehicle over a relatively great range of load variation.

It has heretofore been proposed to obtain a similar result by replacing the spring abutment surfaces corresponding to the fixed surfaces of my previous invention with rollers, but I have found that under such conditions where the springs are to carry a relatively heavy load it is impractical to attempt to transmit such heavy loads through rollers inasmuch as such rollers in sizes capable of being commercially used will break down too quickly in service. This disadvantage may be corrected, however, in accordance with the present invention, by using a combination of rollers and fixed surfaces, the rollers being so positioned as to take the load transmitted to the springs from the vehicle body when the vehicle is under relatively light loads, or is empty, and providing curved fixed abutment surfaces through which the load between the springs of the vehicle will be transmitted, to the exclusion of the rollers, when the load on the vehicle exceeds a predetermined limit. By this means the wear effects of this slippage between the springs and their connection to the vehicle frame under light load is effectively eliminated because the relative movement is taken through the rollers which, through the substantial elimination of sliding friction, results in a "soft" ride under such conditions, and yet a progressive spring is provided in which the heavier loads are taken through fixed abutments but at such time that the relative slippage between the springs and the fixed abutments is comparatively small and, therefore, will not result in excessive wear.

Referring now to the accompanying drawings and particularly to Fig. 1, a semitrailer is illustrated as having a body 10 the forward end of which is conventionally supported through a conventional fifth wheel mechanism indicated at 12, upon the rear end of the tractor vehicle shown in fragmentary view at 14. A conventional type of retractible landing gear is illustrated at 16 which may be employed for supporting the forward end of the semitrailer when the latter is not supported by the tractor vehicle 14. The rear end of the semitrailer is supported by a pair of wheels 18 positioned at opposite sides of the body 10 and rotatably mounted upon the outer ends of an axle 20 in a conventional manner.

Fixed adjacent each end of the axle 20 is a spring seat and clamp assembly, indicated generally at 22, each of which serves to secure a conventional type of multi-leaf semi-elliptic spring 24 midway between its ends to the axle 20. Details of the spring hanger 22 may be obtained by reference to my prior patent previously identified herein. The opposite ends of each spring 24 are connected to the body 10 through a forward spring hanger indicated generally at 26 and a rear spring hanger indicated generally at 28, which spring hangers are rigidly connected to the body 10 through a conventional frame side member 30 or equivalent frame member of the body 10.

Figure 2:
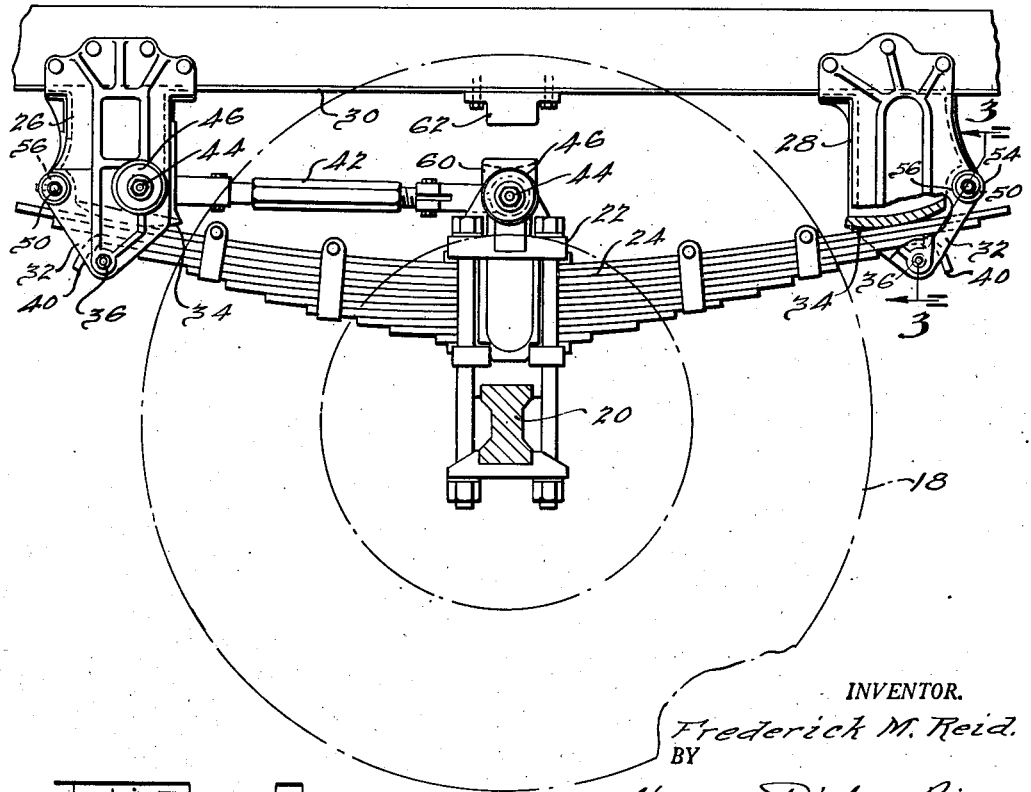
Fig. 2 is an enlarged, fragmentary, partially broken, partially sectioned, side elevational view showing the spring suspension with parts thereof broken away and shown in section, showing the spring suspension illustrated in Fig. 1 when the elements forming the assembly are substantially at their positions for normal load.

The spring hangers 26 and 28 terminate at their lower ends in laterally spaced leg portions 32 between each pair of which is formed a bearing surface or abutment 34 which is longitudinally curved, as best illustrated in Fig. 2. The ends of each spring 24 are received between the legs 32 of the corresponding spring hangers 26 and 28 and under certain load conditions, as will hereinafter be more fully described, lie in contact with the surfaces or abutments 34 in receiving the load on the vehicle through the hangers 26 and 28.

Movement of the ends of the springs away from the surfaces 34 is limited by means of bolts 36 which project through the legs 32 of each spring hanger below the spring received therein and which bolts are secured in place by means of nuts 38, as brought out in Fig. 3. It may be noted, and as brought out in Fig. 3, that the ends of each spring 24 are normally spaced upwardly from the bolts 36, this being necessary to provide for the desired movement of the ends of the springs, as will hereinafter be better appreciated. The ends of those particular leaves of the springs 24 immediately above the bolts 36 may be bent downwardly over the bolts 36, as indicated at 40, in order to aid in limiting relative longitudinal movement between the springs 24 and the hangers 26 and 28, particularly under light load conditions.

Each spring seat assembly 22 is connected with its corresponding forward spring hanger 26 by means of a radius rod structure 42, the connections being made by means of bolts 44 and resilient bushings 46 more complete details of which will be found in my prior patent above identified. The radius rods 42, which are adjustable in length, serve to maintain the axle 20 midway between the spring hangers 26 and 28, and the pivot bolts 44, which are disposed with their axes horizontal and transverse to the length of the trailer are preferably so located that, as illustrated in Fig. 2, when the trailer is under a normal load the radius rods 42 are substantially horizontal. Under such conditions, it will be appreciated that there will be a minimum displacement of the axle 20 and springs 24 longitudinally of the vehicle due to spring deflections while under normal load and this will correspondingly aid in reducing sliding action between the springs 24 and the surfaces 34 under such conditions.

In accordance with the present invention, each spring hanger 26 and 28 between the legs 32 thereof and outwardly of and preferably in spaced relation to the surfaces 34 from the axle 20 are spanned by a pin 50, as best brought out in Fig. 3, the opposite ends of which are relatively closely received in openings 52 provided in the legs 32 for reception of the same. The pins 50 are secured against rotation and relative axial movement with respect to the legs 32 by any suitable means such as keys or the like 54, which are projected through the legs 32 midway between the opposite side faces thereof and into the pins 50. Rotatably mounted on each pin 50 between the legs 32 of the corresponding hanger 26 or 28 is a roller 56, preferably through the interposition of rolling antifriction means such as the needle bearings 58. Rollers 56 are, therefore, mounted for free rotational movement on the pins 50.

The rollers 56 are of such size and so positioned that, as illustrated in Fig. 4, when the trailer is unloaded, or under a relatively light load, then because of the relatively great curvature of the springs 24 under such circumstances the ends of the springs 24 will contact the rollers 50 to the exclusion of the surfaces 34 and at an area closely adjacent the extreme outer ends of the springs 24. Under such conditions, it will be appreciated that the springs 24 are in their condition of maximum flexibility inasmuch as the weight transmitted through them between the body and the axle 20 or wheels 18 is transmitted through the flexible end portions of the springs 24 and at a point of maximum leverage on the springs 24. As a result, relatively small variations in load will cause a material deflection of the springs 24 and, therefore, will result in an easy ride, that is one in which the body may float to a relatively great extent during operation and when the wheels 18 encounter irregularities on the road surface.

It will be appreciated that when the spring is under a no-load or light load condition, as illustrated in Fig. 4, and in which the spring is curved to a maximum extent, a relatively small variation in load on the spring will cause a material displacement of the end portions of the springs in the direction of their length relative to the rollers 56. Because of the fact that the ends of the springs are supported by the rollers 56 under such conditions and the rollers 56 are freely rotatable, there will be no sliding action of the ends of the springs on their cooperating supporting parts, namely the rollers 56, under such conditions which will engender an unwarranted amount of wear.

However, and as previously explained, it has been found commercially impractical to attempt to carry a major load on the vehicle through rollers such as 56 and it is, therefore, desirable to relieve the rollers 56 on any loads which might be destructive to them. Accordingly, and in accordance with the present invention, the rollers 56 are so located that as the load on the vehicle increases from a no-load condition toward a normal load condition, the latter of which may bend the springs 24 to approximately the position illustrated in Fig. 2, the end portions of the springs 24 first bear simultaneously upon the rollers 56 and upon the extreme outer end of the surfaces 34 and, as such load continues to increase, because of the curvature of the surfaces 34 and the straightening out of the springs 24 under such conditions, the line of contact between the springs 24 and the surfaces 34 move inwardly toward one another and contact between the ends of the springs and the rollers 56 is broken, thereby relieving the rollers 56 of any load whatever. When such normal loads are applied to the springs 24, then, as brought out in Fig. 2, the springs 24 approach a flattened condition and at the same time the radius rods 42 are substantially horizontal so that during variations of such load sufficient to cause further or variations in the deflection of the springs 24 the end portions of the springs 24 simply rock on the surfaces 34, such points of contact moving inwardly as to shorten the effective length of the springs 24 and, therefore, increase their resistance to deformation under load as the load increases. While there will be some displacement of the end portions of the springs with respect to the surfaces 34 under such conditions the amount of relative slippage between them will be relatively small and, therefore, not such as to cause an excessive amount of wear as would otherwise occur if the surfaces 34 were depended upon to take the entire load between the springs and the spring hangers from no-load to full load position and as occurs in my prior patent above referred to.

To illustrate the progressively shortening action of the springs 24, in Fig. 5 is shown the so-called "slam" position of the springs 24 and associated mechanism. This is the position in which the springs are subjected to the maximum load capable and in which the stop member 60 mounted upon the upper end of each spring seat assembly 22 contacts the bumper 62 provided for engagement therewith and secured to the frame side member 30 or equivalent. Under such conditions it will be appreciated that the curvature of the spring 24 is reversed to a certain extent and the springs 24 under such conditions contact the extreme inner ends of the surfaces 34, under which conditions the effective length of the springs 24 is at its minimum and consequently the stiffness of the springs 24 and their ability to withstand load is at the maximum. Some slippage between the end portions of the springs 24 and the surfaces 34 will, of course, occur under such conditions but inasmuch as the springs 24 are substantially flat under such conditions there is a minimum amount of slippage at the time such maximum amount of load is applied and, therefore a minimum amount of resulting wear between the springs and the surfaces 34. It will, of course, be appreciated that even in cases where the vehicle is under a light load as illustrated in Fig. 4, and strikes a bump with sufficient force to bend the springs to the slam position shown in Fig. 5, the rollers 56 will not be subjected to the full force of the shock but only to that extent thereof required to separate the springs 24 from the rollers 56.

From the above it will be appreciated that in accordance with the present invention a construction is provided including a so-called "progressive spring," that is one in which its effective length decreases with increase of load, and in which the load is transmitted to the spring through roller means when the load is relatively light and insufficient to over-load the roller means, but that when the load increases to a point endangering over-loading of the rolling means the weight transmitted from the vehicle to the springs is transferred from the rolling means to a fixed surface which is amply able to take care of the load transmitted without danger of breaking down under the load when coupled with the relative sliding action between the springs and the fixed surfaces under such circumstances. The construction, therefore, provides one in which maximum flexibility of the springs is provided under relatively light loads and the corresponding elimination of friction, whereby to provide a soft ride under such conditions and yet provide a means whereby overloading the rollers is prevented by transferring the load being carried from the rollers to a fixed surface which becomes effective at a time where the relative sliding action between the springs and the fixed surfaces approaches a minimum and, therefore, provides no exceptional problem as to wear because of the relative sliding movement between the springs and the fixed surfaces under such conditions.

Having thus described my invention, what I claim by Letters Patent is:

1. In a vehicle spring suspension of the type including a pair of longitudinally spaced spring hangers, a semi-elliptic spring interposed between said hangers, and an axle secured to said spring between the ends of the latter, the combination with said spring hangers of curved surfaces fixed to each thereof and adapted for engagement with the corresponding ends of said spring, the curvature of said surfaces being such that as the load on said spring increases the distance between the points of contact of said spring and said surfaces decreases, and a roller carried by each of said hangers outwardly of said surfaces from said axle, said rollers being so located as to engage said spring and transmit the load of the vehicle from said hangers to said spring when said load is relatively light, and when said spring is deflected by a predetermined increase in said load from said light load position the contact between said spring and said hangers is transferred from said rollers to said fixed surfaces.

2. In a vehicle spring suspension of the type including a pair of longitudinally spaced spring hangers, a semi-elliptic spring interposed between said hangers, and an axle secured to said spring between the ends of the latter, the combination with said spring hangers of curved surfaces fixed to each thereof and adapted for engagement with the corresponding ends of said spring, the curvature of said surfaces being such that as the load on said spring increases the distance between the points of contact of said spring and said surfaces decreases, and a roller carried by each of said hangers outwardly of said surfaces from said axle, said rollers being so located as to engage said spring and transmit the load of the vehicle from said hangers to said spring when said load is relatively light, and when said load is increased from said light load to an amount approaching the desired maximum load desired to be transmitted through said rollers the point of contact between said hangers and said spring is transferred from said rollers to said fixed surfaces.

3. In a vehicle spring suspension of the type including a pair of longitudinally spaced spring hangers, a semi-elliptic spring interposed between said hangers, and an axle secured to said spring between the ends of the latter, the combination with said spring hangers of curved surfaces fixed to each thereof and adapted for engagement with the corresponding ends of said spring, the curvature of said surfaces being such that as the load on said spring increases the distance between the points of contact of said spring and said surfaces decreases to provide for shortening the effective length of said springs during increase of load thereon, and a freely rotatable roller carried by each of said hangers outwardly from said fixed surfaces with respect to said axle and in a position to take the load on said springs to the exclusion of said fixed surfaces when said springs are curved to an extent approaching the maximum curvature thereof under no-load conditions.

4. In a vehicle spring suspension of the type including a pair of longitudinally spaced spring hangers, a semi-elliptic spring interposed between said hangers, and an axle secured to said spring between the ends of the latter, the combination with said spring hangers of curved surfaces fixed to each thereof and adapted for engagement with the corresponding ends of said spring, the curvature of said surfaces being such that as the load on said spring increases the distance between the points of contact of said spring and said surfaces decreases, a roller carried by each of said hangers outwardly of said surfaces from said axle, said rollers being so located as to engage said spring and transmit the load of the vehicle from said hangers to said spring when said load is relatively light, and when said spring is deflected by a predetermined increase in said load from said light load position the contact between said spring and said hangers is transferred from said rollers to said fixed surfaces and a radius rod interconnecting said axle and one of said hangers.

5. In a vehicle spring suspension of the type including a pair of longitudinally spaced spring hangers, a semi-elliptic spring interposed between said hangers, and an axle secured to said spring between the ends of the latter, the combination with said spring hangers of curved surfaces fixed to each thereof and adapted for engagement with the corresponding ends of said spring, the curvature of said surfaces being such as the load on said spring increases the distance between the points of contact of said spring and said surfaces decreases to provide for shortening the effective length of said springs during increase of load thereon, a freely rotatable roller carried by each of said hangers outwardly from said fixed surfaces with respect to said axle and in a position to take the load on said springs to the exclusion of said fixed surfaces when said springs are curved to an extent approaching the maximum curvature thereof under no-load conditions, and a radius rod having opposite ends thereof pivoted to one of said hangers and with respect to said axle, said points of pivot lying substantially in a horizontal plane under normal load conditions of said spring when said load on said spring is taken through said fixed surfaces.

FREDERICK M. REID.